United States Patent
Sakakibara

(10) Patent No.: US 7,106,027 B2
(45) Date of Patent: Sep. 12, 2006

(54) BATTERY CHANGERS

(75) Inventor: Kazuyuki Sakakibara, Anjo (JP)

(73) Assignee: Makita Corporation, Anio (JP)

( * ) Notice: Subject to any disclaimer, the term of this patent is extended or adjusted under 35 U.S.C. 154(b) by 245 days.

(21) Appl. No.: 10/744,924

(22) Filed: Dec. 23, 2003

(65) Prior Publication Data
US 2004/0135553 A1    Jul. 15, 2004

(30) Foreign Application Priority Data
Dec. 24, 2002  (JP)  ............... 2002-371423

(51) Int. Cl.
*H02J 7/00*    (2006.01)
(52) U.S. Cl. .................................. 320/150
(58) Field of Classification Search ............... 320/150, 320/151–153, 110, 106
See application file for complete search history.

(56) References Cited

U.S. PATENT DOCUMENTS

| | | | | |
|---|---|---|---|---|
| 5,592,070 | A * | 1/1997 | Mino | 320/163 |
| 5,864,224 | A * | 1/1999 | Takechi et al. | 320/152 |
| 6,075,347 | A * | 6/2000 | Sakakibara | 320/150 |
| 6,124,698 | A * | 9/2000 | Sakakibara | 320/110 |
| 6,191,560 | B1 * | 2/2001 | Sakakibara | 320/150 |
| 6,204,640 | B1 | 3/2001 | Sakakibara | |
| 6,204,641 | B1 * | 3/2001 | Sakakibara | 320/153 |
| 6,225,786 | B1 * | 5/2001 | Muramatsu et al. | 320/150 |
| 6,275,009 | B1 | 8/2001 | Sakakibara et al. | |
| 6,278,261 | B1 * | 8/2001 | Sakakibara | 320/150 |
| 6,362,600 | B1 | 3/2002 | Sakakibara | |
| 6,373,228 | B1 | 4/2002 | Sakakibara | |
| 6,404,167 | B1 * | 6/2002 | Sakakibara | 320/132 |
| 6,433,517 | B1 * | 8/2002 | Sakakibara | 320/153 |
| 6,476,584 | B1 * | 11/2002 | Sakakibara | 320/150 |
| 6,563,290 | B1 * | 5/2003 | Sakakibara et al. | 320/106 |
| 6,603,288 | B1 * | 8/2003 | Sakakibara | 320/151 |

FOREIGN PATENT DOCUMENTS

| | | | |
|---|---|---|---|
| DE | 4200693 | * | 5/1993 |
| EP | 0 982 829 A2 | | 1/2000 |
| GB | 2 276 783 A | | 5/1994 |
| JP | 11-355972 | | 12/1999 |
| JP | 2000-23387 | | 1/2000 |

OTHER PUBLICATIONS

Smart Battery Data Specification@http://www.sbs-forum.org/specs/errata_sbdat110a.pdf., Revision 1.1, Dec. 1998.*
European Search Report dated Apr. 4, 2005.

* cited by examiner

*Primary Examiner*—Pia Tibbits
(74) *Attorney, Agent, or Firm*—Orrick, Herrington & Sutcliffe LLP

(57) ABSTRACT

Battery pack (50) may include rechargeable batteries (55) and first temperature sensor TM1 for detecting the temperature of batteries (55). Battery charger (10) may include power source circuit (32) for supplying charging current to batteries (55) of battery pack (50). Battery charger (10) may also include second temperature sensor TM2 located in the vicinity of power source circuit (32). Battery charger (10) may further include a processor for controlling power source circuit (32). The processor may select charging current that will be supplied by power source circuit (32) to batteries (55) based at least upon battery temperature from first temperature sensor TM1 and power source circuit temperature from second temperature sensor TM2, and supply the selected charging current to batteries (55).

4 Claims, 5 Drawing Sheets

FIG. 2

|  |  | Battery Temperature Ta | | | | |
|---|---|---|---|---|---|---|
|  |  | ~$Ta_1$ | $Ta_1$~$Ta_2$ | $Ta_2$~$Ta_3$ | $Ta_3$~$Ta_4$ | $Ta_4$~ |
| dTa/dt | ~$Xa_1$ | $Ia_{11}$ | $Ia_{12}$ | $Ia_{13}$ | $Ia_{14}$ | $Ia_{15}$ |
|  | $Xa_1$~$Xa_2$ | $Ia_{21}$ | $Ia_{22}$ | $Ia_{23}$ | $Ia_{24}$ | $Ia_{25}$ |
|  | $Xa_2$~ | $Ia_{31}$ | $Ia_{32}$ | $Ia_{33}$ | $Ia_{34}$ | $Ia_{35}$ |

 Final Stage of Charging

FIG. 3

|  |  | PowerSourceCircuitTemperature Tb | | | | |
|---|---|---|---|---|---|---|
|  |  | ~$Tb_1$ | $Tb_1$~$Tb_2$ | $Tb_2$~$Tb_3$ | $Tb_3$~$Tb_4$ | $Tb_4$~ |
| dTb/dt | ~$Xb_1$ | $Ib_{11}$ | $Ib_{12}$ | $Ib_{13}$ | $Ib_{14}$ | $Ib_{15}$ |
|  | $Xb_1$~$Xb_2$ | $Ib_{21}$ | $Ib_{22}$ | $Ib_{23}$ | $Ib_{24}$ | $Ib_{25}$ |
|  | $Xb_2$~ | $Ib_{31}$ | $Ib_{32}$ | $Ib_{33}$ | $Ib_{34}$ | $Ib_{35}$ |

BATTERY CHANGERS

CROSS REFERENCE

This application claims priority to Japanese patent application number 2002-371423, filed Dec. 24, 2002, the contents of which are hereby incorporated by reference as if fully set forth herein.

BACKGROUND OF THE INVENTION

1. Field of the Invention

The present invention relates to battery chargers for charging rechargeable batteries.

2. Description of the Related Art

Japanese Laid-open Patent Publication No. 2000-23387 describes a battery charger that suppresses the temperature increase of a power source circuit of the battery charger. The known battery charger includes a temperature sensor for detecting the temperature of the power source circuit, and a switch electrically connecting and disconnecting the battery with the power source circuit. When the temperature of the power source circuit detected by the temperature sensor exceeds a predetermined value, the switch is turned OFF. As a result, the supply of charging current to the battery from the power source circuit is halted, thereby suppressing the temperature increase of the power source circuit.

SUMMARY OF THE INVENTION

However, in the known battery charger, the supply of charging current to the battery from the power source circuit is caused to be OFF when the temperature of the power source circuit exceeds the predetermined value. Consequently, no charging whatsoever of the battery is performed when the temperature of the power source circuit has risen. As a result, charging requires a long time.

It is, accordingly, one object of the present teachings to provide improved battery chargers suppresses the temperature increase of the power source circuit while allowing the battery to be charged efficiently.

In one aspect of the present teachings, a battery pack may include one or more rechargeable battery cells (e.g., nickel metal hydride battery cells, nickel cadmium battery cells). The battery pack may have a first temperature sensor for detecting the temperature of the battery cells. The battery pack may be coupled to appliances (e.g., cordless power tools, cordless electric vacuum cleaner). When the battery pack is discharged, the battery pack may be preferably detached from the appliance and coupled to a battery charger. The battery charger may have a power source circuit arranged and constructed to supply charging current to the battery pack. The battery charger may include a second temperature sensor for detecting the temperature of the power source circuit. The battery charger may also include a controller (e.g., processor, microprocessor or microcomputer) for controlling the power source circuit. The controller preferably (i) selects charging current that will be supplied by the power source circuit to the battery cells based at least upon battery temperature from the first temperature sensor and power source circuit temperature from the second temperature sensor, and (ii) supplies the selected charging current to the battery cells. Since the controller selects charging current based at least upon battery temperature and power source circuit temperature, the battery pack can be charged efficiently while the both temperature increases of the power source circuit and the battery cells can be suppressed.

In another aspect of the present teachings, the controller preferably calculates battery temperature increase rate based upon signals from the first temperature sensor and power source temperature increase rate based upon signals from the second temperature sensor. Then, the controller selects charging current that will be supplied by the power source circuit to the battery cells based further upon the calculated temperature increase rates. Since the charging current is selected based further upon the battery temperature increase rate and the power source circuit temperature increase rate, the battery pack can be charged more efficiently.

In another aspect of the present teachings, the controller preferably (1) selects a first allowable charging current value based upon the battery temperature and the battery temperature increase rate, (2) selects a second allowable charging current value based upon the power source circuit temperature and the power source circuit temperature increase rate, and (3) selects the smaller of the first and second allowable charging current values as the charging current that will be supplied by the power source circuit to the battery cells. For example, the controller may select the first allowable charging current value form a first look up table using the battery temperature and battery temperature increase rate as indices for the first look up table. Also, the controller may select the second allowable charging current value form a second look up table using the power source circuit temperature and power source circuit temperature increase rate as indices for the second look up table. The battery charger may further include a memory. The first and second look up table may be stored in the memory of the battery charger.

In another aspect of the present teachings, the controller preferably terminates the supply of charging current to the battery cells based upon a determination that relatively low first allowable charging currents have been repeatedly selected over series of intervals. Since the controller automatically stops the charging, full charging can be performed without overcharging.

These aspects and features may be utilized singularly or, in combination, in order to make improved battery charger. In addition, other objects, features and advantages of the present teachings will be readily understood after reading the following detailed description together with the accompanying drawings and claims. Of course, the additional features and aspects disclosed herein also may be utilized singularly or, in combination with the above-described aspect and features.

BRIEF DESCRIPTION OF THE DRAWINGS

FIG. 2 is an explanatory drawing showing the contents of a first map stored in a memory of the battery charger.

FIG. 3 is an explanatory drawing showing the contents of a second map stored in the memory of the battery charger.

DETAILED DESCRIPTION OF THE INVENTION

Detailed Representative Embodiment

Figure 1:
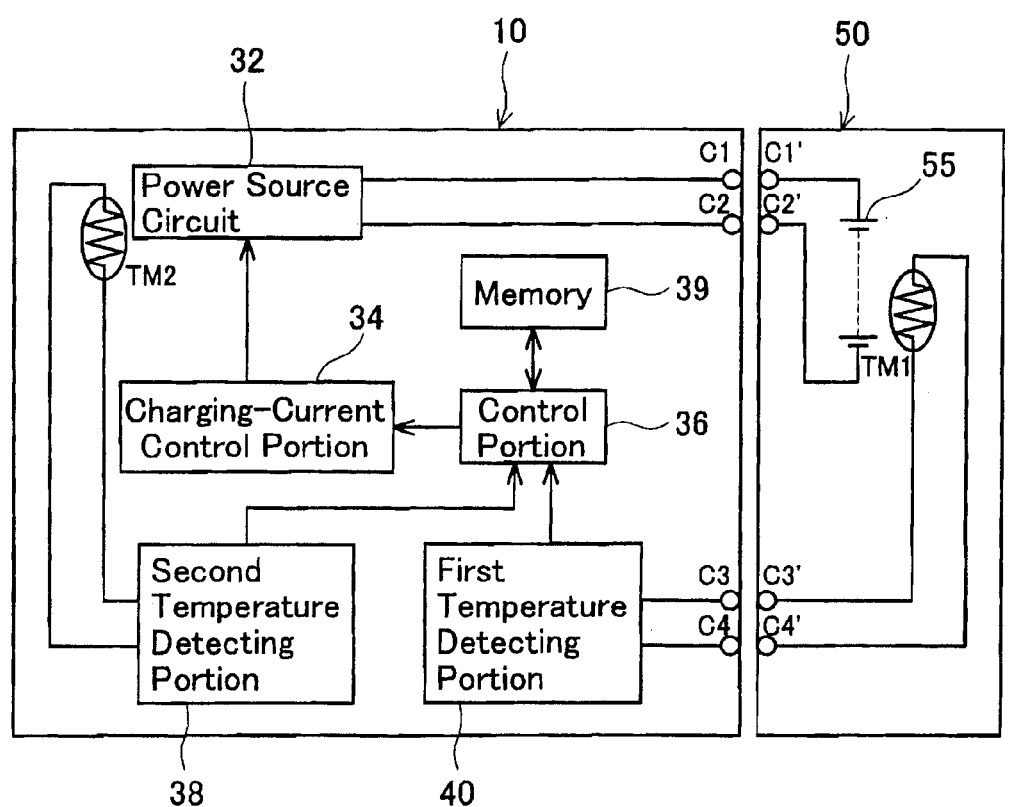
FIG. 1 is a block diagram schematically showing a representative control circuit of a battery charger according to a representative embodiment of the present teachings.

A battery charger according to a representative embodiment of the present teachings will be explained below with reference to the drawings. FIG. 1 is a block diagram schematically showing battery charger 10 connected with battery pack 50. As shown in FIG. 1, when battery pack 50 is connected with battery charger 10, connecting terminals C1~C4 of battery charger 10 make contact with connecting terminals C1'~C4' of battery pack 50, respectively. Battery pack 50 may include a plurality of nickel metal hydride batteries 55 that are serially connected. Battery pack 50 may also include temperature sensor TM1 for detecting the temperature of batteries 55. Temperature sensor TM1 may include a thermister having an electrical resistance that varies in accordance with variation in temperature. Batteries 55 and temperature sensor TM1 are disposed within a housing of battery pack 50. Connecting terminals C1'~C4' are disposed on a surface of the housing of battery pack 50.

The control circuit of battery charger 10 may include the following functional circuits: power source circuit 32, charging-current control portion 34, control portion 36, second temperature detecting portion 38, first temperature detecting portion 40, and memory 39. Power source circuit 32 may be connected with an external commercial power source. Power source circuit 32 supplies charging current to batteries 55 of battery pack 50. Power source circuit 32 may comprise a rectifying circuit, a transformer, FETs, and diodes. Battery charger 10 may also have temperature sensor TM2 for detecting the temperature of power source circuit 32. Temperature sensor TM2 may be preferably attached to a surface of a diode of a secondary side of the transformer of power source circuit 32. In the alternative, temperature sensor TM2 may detect the temperature at another part of power source circuit 32 (e.g., (i) the temperature of a primary side FET (ii) the temperature of the transformer (iii) the temperature of a primary side/secondary side heat waster (iv) the temperature of molded resin (e.g., urethane) (v) the ambient temperature within the charger). Temperature sensor TM2 may also include a thermister having an electrical resistance that varies in accordance with variation in temperature.

During charging, second temperature detecting portion 38 detects the temperature of power source circuit 32 on the basis of signals from temperature sensor TM2. Temperature sensor TM1 of battery pack 50 is coupled to first temperature detecting portion 40 via connecting terminals C3–C3' and C4–C4'. First temperature detecting portion 40 detects the temperature of batteries 55 on the basis of signals from temperature sensor TM2.

Memory 39 may store current control information, such as a map that stores specific values corresponding to appropriate charging currents, which are supplied to batteries 55 in accordance with the rate of battery temperature increase. Memory 39 is coupled to control portion 36.

Control portion 36 may comprise a microprocessor or microcomputer that includes, e.g., central processing unit (CPU), read only memory (ROM), random access memory (RAM) and input/output port (I/O). Control portion 36 preferably calculates temperature-increase rate of power source circuit 32 by differentiating the temperature of power source circuit 32, which was output from second temperature detecting portion 38. Control portion 36 also calculates temperature-increase rate of batteries 55 by differentiating the detected temperature of batteries 55, which was output from first temperature detecting portion 40.

Utilizing the battery temperature and the battery temperature-increase rate, control portion 36 preferably retrieves a first map and thereby read a first allowable charging current value that permits charging while suppressing an increase in battery temperature. Utilizing the power source circuit temperature and the power source circuit temperature-increase rate, control portion 36 further retrieves a second map and thereby read a second allowable charging current value that permits charging while suppressing an increase in temperature of power source circuit 32. Then, control portion 36 selects the smaller of the first and second allowable charging current values, and control portion 36 preferably outputs the selected allowable charging current value, which serves as a current instruction value, to charging-current control portion 34. Charging-current control portion 34 controls power source circuit 32 on the basis of the selected allowable charging current value output from control portion 36, and adjust the charging current supplied to batteries 55.

With the battery, if charging current increases, charging time becomes shorter but battery temperature rise becomes greater. Conversely, if charging current decrease, charging time becomes longer but battery temperature rise becomes smaller. A Nickel metal hydride battery, in particular, has characteristics that a temperature gradient (i.e., temperature rise value) varies greatly with charging current and already charged capacity. Due to this, in the present representative embodiment, in order to complete charging within a shorter period while preventing the temperature of the battery from rising, the values of the charging current are changed while charging is performed.

With the power source circuit, if charging current increases, the temperature of the power source circuit increases greatly. This increase in temperature can be mitigated by increasing power source circuit capacity, but this increases size and cost of the power source circuit. Further, if the temperature of the power source circuit is high, charging current may need to be reduced in order to avoid damaging the power source circuit.

In the present representative embodiment, both battery temperature and power source circuit temperature are respectively dealt with by applying relatively low charging current when the temperature thereof is high. Conversely, when the temperature thereof is low, relatively high charging current is applied. Further, when the increase in temperature is high, relatively low charging current is applied. Conversely, when the increase in temperature is small, relatively high charging current is applied. Specifically, the first and second allowable charging current values are retrieved from the maps that concern the battery and the power source circuit respectively, the two allowable charging current values are compared, and the smaller thereof is selected.

The configuration of the aforementioned maps used for charging current control will now be described with reference to FIGS. 2 and 3. The first map, shown in FIG. 2, serves to variably control the charging current, wherein the battery temperature Ta indicated along the horizontal direction of the map, and the change in temperature $dTa/dt$ indicated along the vertical direction are taken to define the first allowable charging current values that permit charging while suppressing the increase in battery temperature. Specifically, if the temperature of batteries 55 is high and the increase in temperature is high, then relatively low charging current (e.g., Ia35) is applied (lower right side of the map). If the temperature of the batteries 55 is high and the increase in temperature is low, then moderate level of charging current (e.g., Ia15) is applied (upper right side of the map). Further, if the temperature of the batteries 55 is low and the increase in temperature is high, a moderate level of charging current (e.g., Ia31) is applied (lower left side of the map). If the temperature of the batteries 55 is low and the increase in temperature is low, relatively high charging current (e.g., Ia11) is applied (upper left side of the map). That is, each region within the first map provides as high a charging current as possible within a range whereby the battery temperature Ta does not exceed permissible temperatures. Moreover, as battery performance deteriorates when a large current charge is performed at low temperatures (e.g., 0° C. or below), the lower current values in the left column of the first map may be preferably such that battery performance does not deteriorate.

The second map, shown in FIG. 3, serves in the same manner as the first map to variably control the charging current, wherein the power source circuit temperature Tb indicated along the horizontal direction of the map, and the temperature difference dTb/dt indicated along the vertical direction are taken to define the second allowable charging current values that permit charging while suppressing the increase in temperature of power source circuit 32. Specifically, if the temperature of power source circuit 32 is high and the increase in temperature is high, then relatively low charging current (e.g., Ib35) is applied (lower right side of the map). If the temperature of power source circuit 32 is high and the increase in temperature is low, then moderate level of charging current (e.g., Ib15) is applied (upper right side of the map). Further, if the temperature of power source circuit 32 is low and the increase in temperature is high, moderate level of charging current (e.g., Ib31) is applied (lower left side of the map). If the temperature of power source circuit 32 is low and the increase in temperature is low, relatively high charging current (e.g., Ib11) is applied (upper left side of the map). That is, each region within the second map provides as high a charging current as possible within a range whereby the temperature of power source circuit 32 does not exceed permissible temperatures.

During charging, control portion 36 preferably retrieves the first allowable charging current value for regulating the battery temperature Ta and the second allowable charging current value for regulating the power source circuit temperature Tb from the first and second maps having the allowable charging current values mapped therein, compares the two allowable charging current values, and selects the smaller of the two values. For example, when the battery temperature is Ta3~Ta4, and the change in battery temperature (i.e., battery temperature-increase rate) is Xa1~Xa2, then the current value provided in region Ia24 is the first allowable charging current value. Also, when the power source circuit temperature is Tb3~Tb4, and the change in power source circuit temperature (i.e., power source circuit temperature-increase rate) is Xb1~Xb2, then the current value provided in region Ib24 is the second allowable charging current value. Then, the two values are compared, and the smaller of the two is output to charging-current control portion 34.

Furthermore, control portion 36 may determine the completion of charging on the basis of change in the regions selected from within the first map. That is, the charging current varies as time passes, and consequently it is not possible to determine the completion of charging simply by observing the battery temperature, changes in the battery temperature values, battery voltage, or changes in the battery voltage values. For this reason, the change in the regions selected within the first map is used to determine the completion of charging.

In the case where charging is performed using the first map, before the battery is fully charged, the temperature of batteries 55 and the change in the temperature-increase values leads varied regions to be selected as the first allowable charging current value. That is, when the temperature of batteries 55 is high, or the increase in battery temperature is high, a region having a relatively low charging current is selected (i.e., a region on the lower side and/or the right side of the first map shown in FIG. 2 is selected), whereupon the temperature of batteries 55, or the increase in battery temperature is reduced, and consequently a region on the upper side of the first map is then selected.

On the other hand, when batteries 55 approach the fully charged state, the increase in battery temperature remains high due to the characteristics of the nickel metal hydride battery. That is, even though a lower region is selected from the first map and a relatively low charging current is applied, the increase in battery temperature remains high and consequently a region on the lower side of the first map is again selected. Because of this, control portion 36 may take measurements at predetermined intervals (e.g., at intervals of several hundred seconds). When the region selected is continuously (e.g., three times) one of the hatched regions shown in FIG. 2 (i.e., the regions Ia31, Ia32, Ia33, Ia34 and Ia35 selected when the increase in battery temperature is large, and the region Ia25 selected when the increase in battery temperature is moderate), control portion 36 may determine that charging is complete, and terminate charging of batteries 55.

Figure 4:
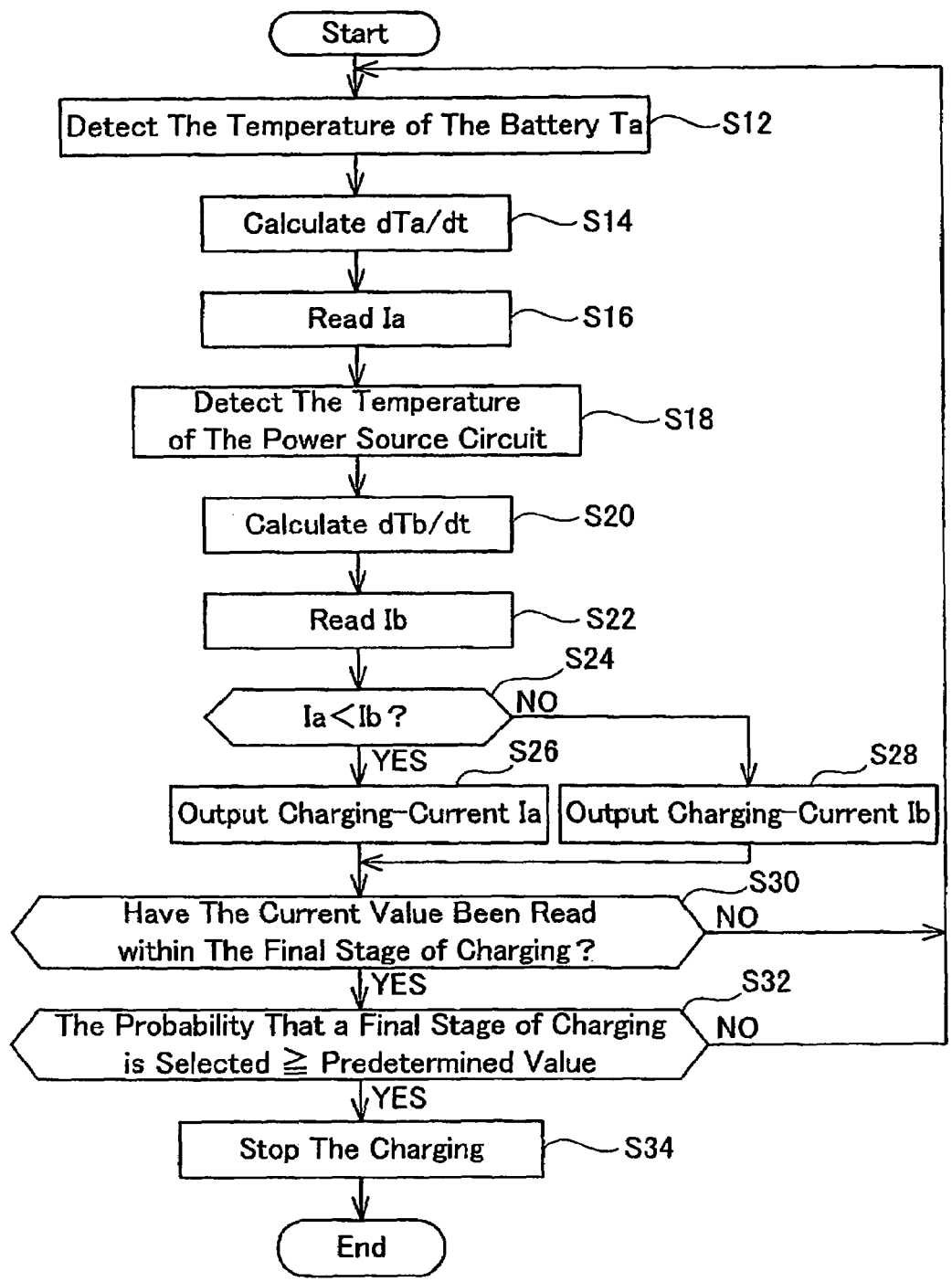
FIG. 4 is a flowchart showing processing performed by a control portion of the battery charger.

The representative operation of battery charger 10 will now be explained with reference to the flowchart of FIG. 4. First, control portion 36 detects the temperature Ta of batteries 55 (step S12). Next, control portion 36 calculates the temperature-increase rate dTa/dt of batteries 55 by differentiating the detected temperature Ta (step S14). Then, based upon the battery temperature Ta and the battery temperature-increase rate dTa/dt, control portion 36 retrieves the first map and read a first allowable charging current value Ia (step S16).

Next, control portion 36 detects the temperature Tb of power source circuit 32 (step S18), and calculates the temperature-increase rate dTb/dt of power source circuit 32 by differentiating the detected temperature Tb (step S20). Then, based upon the temperature Tb and the power source circuit temperature-increase rate dTb/dt, control portion 36 retrieves the second map and read a second allowable charging current value Ib (step S22).

Next, control portion 36 determines whether the second allowable charging current value Ib exceeds the first allowable charging current value Ia (step S24). In the case where the second allowable charging current value Ib exceeds the first allowable charging current value Ia (YES in step S24), control portion 36 selects the first allowable charging current value Ia as the optimal charging current value, and outputs a current command in accordance with this selection to charging-current control portion 34 (step S26). If the first allowable charging current value Ia exceeds the second allowable charging current value Ib (NO in step S24), control portion 36 selects the second allowable charging current value Ib as the optimal charging current value, and outputs a current command in accordance with this selection to charging-current control portion 34 (step S28). By this means, charging-current control portion 34 controls power source circuit 32 in a manner whereby the charging current dose not exceed the optimal current value (i.e., the smaller of the first allowable charging current value Ia and the second allowable charging current value Ib) indicated from the control portion 36.

Next, control portion 36 determines whether the first allowable charging current value have been selected within final stage of charging regions (i.e., the hatched regions Ia31, Ia32, Ia33, Ia34, Ia35 and Ia25 of the first map shown in FIG. 2) (step S30). In the case where the first allowable charging current value have not been selected from the final stage of charging regions (NO in step S30), the process returns to step S12, and the process is repeated from step S12. In the case where the first allowable charging current value have been read from the final stage of charging regions (YES in step S30), the process proceeds to step S32 and control portion 36 determines whether there is a high frequency (i.e., probability) that the first allowable charging current value is selected from the final stage of charging region of the first map. For example, if the first allowable charging current values have been selected from the final stage of charging regions for three consecutive cycles, control portion 36 may determine that there is a high probability of a final stage of charging region being selected. If it is determined that there is a low probability that a final stage of charging region is selected (NO in step S32), the process returns to step S12, and charging continues. If it is determined that there is a high probability that a final stage of charging region is selected (YES in step S32), charging is completed (step S34).

In the example described above, it is only for ease of exposition that the probability of a final stage of charging region being selected is high when final stage of charging regions have been selected for three consecutive cycles. Nonetheless, a variety of other methods can be used to determine whether there is a high probability of a final stage of charging region being selected. For example, it can be determined that the probability is high when a final stage of charging region has been selected eight times in ten cycles.

Figure 5:
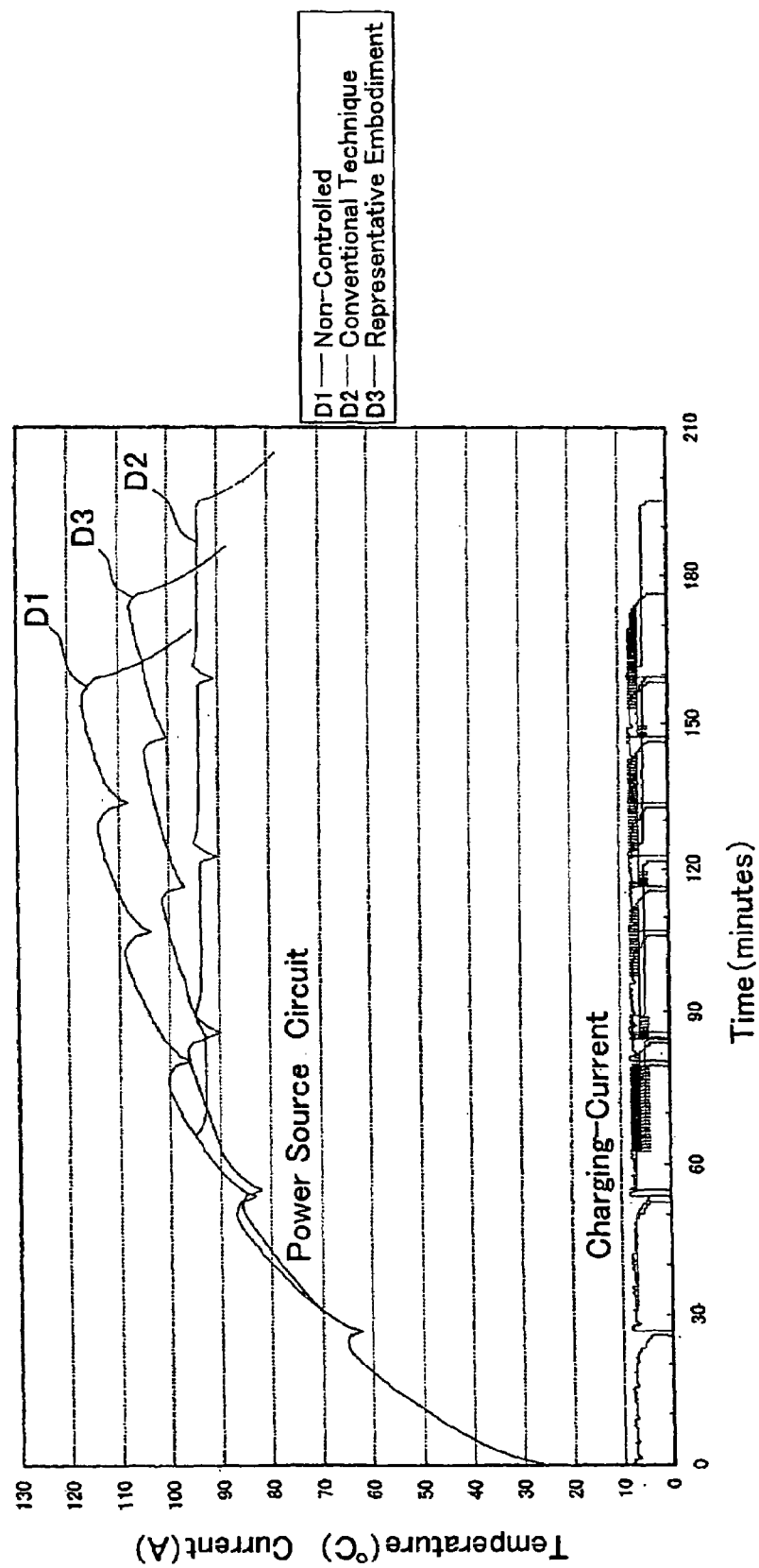
FIG. 5 graphically depicts results of temperature transitions of the power source circuit of the battery charger when six battery packs are charged.
Figure 6:
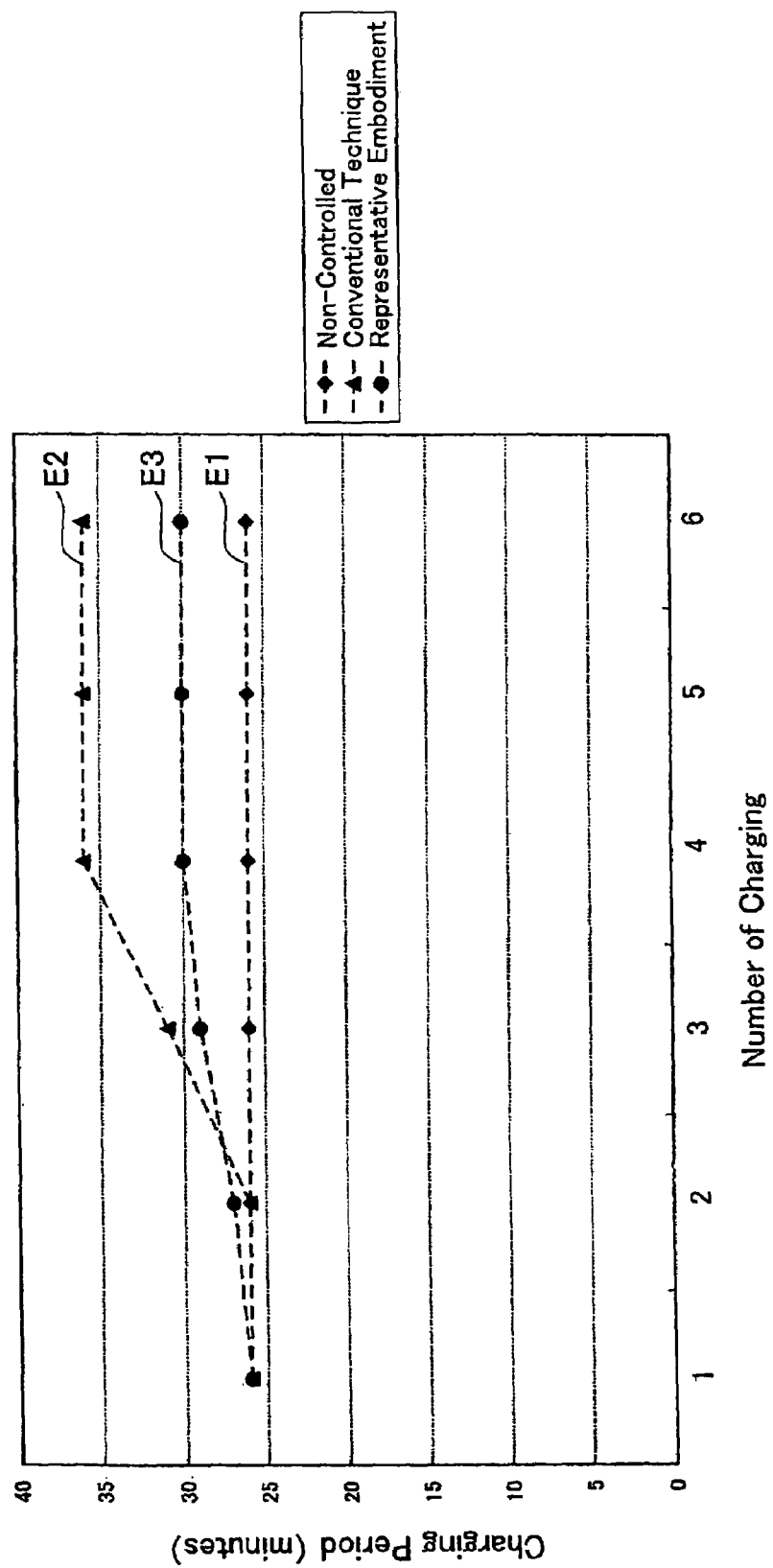
FIG. 6 graphically depicts results of charging time when the six battery packs are charged.

Next, an example of the data measured while battery charger performs charging will be described. FIG. 5 shows temperature transitions of power source circuit 32 when battery charger 10 consecutively charges six battery packs 50 by means of rapid charging performed in up to 30 minutes. FIG. 6 shows the charging periods during this charging. In both figures, the following is shown: the case where control portion 36 of battery charger 10 controls using the first and second allowable charging current values Ia and Ib (i.e., the case of the representative embodiment), the case where the charging current value is fixed (i.e., non-controlled case), and the case where the charging current value is fixed and the supply of charging current to the battery is stopped when the detected temperature of the power source circuit exceeds a specific temperature (i.e., the case of the conventional technique).

In both figures, although the charging period is fixed in the case of the non-controlled case (D1, E1), overheating of the power source circuit temperatures cannot be avoided as additional battery packs are charged. As a result, it is necessary to increase the power source circuit capacity, and it is difficult to miniaturize the battery charger. In the case of the conventional technique (D2, E2), a protecting power source circuit functions at the specified temperature. Although this prevents the power source circuit temperatures from rising beyond the specific temperature, charging requires commensurate extra time for this process. By contrast, in the case of the present representative embodiment (D3, E3), the increase in power source circuit temperatures is more gradual than in the non-controlled case D1, and the charging period is far shorter than with the conventional technique E2. As a result, battery charger 10 allows the twin goals of miniaturization and a reduced charging period to be realized in a well-balanced manner.

As is clear from the above, in the above illustrated representative embodiment, a comparatively small power source circuit produces a large output (i.e., charging current), and charging efficiency is increased by reducing output by a suitable extent when the elements of the power source circuit grow hot. That is, even though the power source circuit is miniaturized, the charging current is output efficiently from the power source circuit, thus enabling rapid charging within a short period.

Moreover, in the present representative embodiment, the explanation was given using, as an example, the process for charging a nickel metal hydride battery. However, the battery charger and charging method of the present teachings can also be applied to the charging of other rechargeable batteries. For example, the first map shown in FIG. 2 can be applied to the charging of a nickel cadmium battery by adjusting this map to suit the characteristics of nickel cadmium batteries.

Finally, although the preferred representative embodiment has been described in detail, the present embodiment is for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

The invention claimed is:

1. An apparatus comprising:
   a battery pack comprising battery cells and a first temperature sensor coupled to the battery cells, and
   a battery charger comprising a power source circuit arranged and constructed to supply charging current to the battery cells, a second temperature sensor coupled to the power source circuit and a processor arranged and constructed to (i) calculate battery temperature increase rate based upon signals from the first temperature sensor and power source temperature increase rate based upon signals from the second temperature sensor, (ii) select a first allowable charging current value based upon the battery temperature and the calculated battery temperature increase rate, (iii) select a second allowable charging current value based upon the power source circuit temperature and the calculated power source circuit temperature increase rate, (iv) select the smaller of the first and second allowable charging current values as the charging current that will be supplied by the power source circuit to the battery cells, and (v) supply the selected charging current to the battery cells.

2. An apparatus as in claim 1, wherein the processor is further arranged and constructed to terminate the supply of charging current to the battery cells based upon a determination that relatively low first allowable charging currents have been repeatedly selected over series of intervals.

3. A battery charger adapted to supply current to a removable battery pack comprising battery cells, a first temperature sensor coupled to the battery cells and a charging terminal, comprising:
   a power source circuit,
   a second temperature sensor coupled to the power source circuit, a first terminal arranged and constructed to couple to the first temperature sensor, a second terminal coupled to the power source circuit and arranged and constructed to conduct charging current via the charging terminal to the battery cells, and a controller coupled to the first terminal, the second temperature sensor and the power source circuit, the controller being arranged and constructed to (i) calculate battery temperature increase rate based upon signals received from the first terminal and power source temperature increase rate based upon signals from the second temperature sensor, (ii) select a first allowable charging current value based upon the battery temperature and the calculated battery temperature increase rate, (iii) select a second allowable charging current value based upon the power source circuit temperature and the calculated power source circuit temperature increase rate, and select the smaller of the first and second allowable charging current as the charging current that will be supplied by the power source circuit to the second terminal.

4. A battery charger as in claim 3, wherein the controller is further arranged and constructed to terminate the supply of charging current to the second terminal based upon a determination that relatively low first allowable charging currents have been repeatedly selected over series of intervals.

* * * * *